United States Patent
Shen et al.

(10) Patent No.: US 8,306,562 B2
(45) Date of Patent: Nov. 6, 2012

(54) SIGNAL-TO-INTERFERENCE RATIO TARGET CONTROL FOR MULTI-DATA-RATE COMMUNICATION SYSTEMS

(75) Inventors: Chiang-Hwa Shen, Poway, CA (US); Wei Lin, San Diego, CA (US)

(73) Assignee: Texas Instruments Incorporated, Dallas, TX (US)

( * ) Notice: Subject to any disclaimer, the term of this patent is extended or adjusted under 35 U.S.C. 154(b) by 1661 days.

(21) Appl. No.: 10/447,505

(22) Filed: May 29, 2003

(65) Prior Publication Data
US 2004/0242253 A1    Dec. 2, 2004

(51) Int. Cl.
*H04B 7/00* (2006.01)

(52) U.S. Cl. ..... 455/522; 455/69; 455/452.2; 455/343.5

(58) Field of Classification Search .............. 455/522, 455/69, 13.4, 343.5, 452.2, 114.3, 127.1, 455/127.5, 298, 343.1, 571, 572, 574, 343.6; 370/318, 312
See application file for complete search history.

(56) References Cited

U.S. PATENT DOCUMENTS

| | | | | |
|---|---|---|---|---|
| 5,751,725 A | * | 5/1998 | Chen | 714/708 |
| 6,034,952 A | * | 3/2000 | Dohi et al. | 370/335 |
| 6,175,590 B1 | * | 1/2001 | Stein | 375/225 |
| 6,512,925 B1 | * | 1/2003 | Chen et al. | 455/442 |
| 6,564,067 B1 | * | 5/2003 | Agin | 455/522 |
| 6,609,008 B1 | * | 8/2003 | Whang et al. | 455/522 |
| 6,763,244 B2 | * | 7/2004 | Chen et al. | 455/522 |
| 6,907,018 B1 | * | 6/2005 | Paranchych et al. | 370/332 |
| 7,035,676 B2 | * | 4/2006 | Ranta | 455/574 |
| 2002/0061073 A1 | * | 5/2002 | Huang et al. | 375/295 |
| 2002/0115468 A1 | * | 8/2002 | Haim | 455/522 |
| 2002/0142791 A1 | * | 10/2002 | Chen et al. | 455/522 |
| 2003/0104831 A1 | * | 6/2003 | Razavilar et al. | 455/522 |
| 2004/0058699 A1 | * | 3/2004 | Jonsson et al. | 455/522 |
| 2004/0092233 A1 | * | 5/2004 | Rudrapatna | 455/69 |

* cited by examiner

*Primary Examiner* — Shaima Q Aminzay
(74) *Attorney, Agent, or Firm* — Ronald O. Neerings; Wade James Brady, III; Frederick J. Telecky, Jr.

(57) ABSTRACT

A communication device adjusts its power level based on a desired quality of service and based on a data rate being used to transmit data. The communication device may comprise a processor, a transceiver, and a power source that provides a power level to the transceiver for transmitting data at a variable rate. The processor obtains a first value indicative of a number of transmission errors, computes a second value using the first value and based on the data rate, and determines whether the second value is below a threshold. Based on a comparison of the second value to said threshold, the processor initiates a change in the power level. Additionally or alternatively, the processor may adjust the power level based on whether a current frame contains an error, but not permitting the power level to be decreased to a level at which a signal-to-interference ratio falls below a threshold.

26 Claims, 1 Drawing Sheet

SIGNAL-TO-INTERFERENCE RATIO TARGET CONTROL FOR MULTI-DATA-RATE COMMUNICATION SYSTEMS

CROSS-REFERENCE TO RELATED APPLICATIONS

The subject matter described herein may relate to the subject matter in the following co-pending applications: U.S. Ser. No. 10/303,463, entitled "Method And Apparatus for Fast Convergent Power Control In A Spread Spectrum Communication System," filed Nov. 25, 2002; U.S. Ser. No. 10/303,986, entitled "Method And Apparatus For Low Power-Rise Power Control Using Sliding Window Weighted QOS Measurements," filed Nov. 25, 2002; and U.S. Ser. No. 10/303,189, entitled "Method And Apparatus For Setting the Threshold Of A Power Control Target In A Spread Spectrum Communication System." filed Nov. 25, 2002, all of which are incorporated herein by reference.

STATEMENT REGARDING FEDERALLY SPONSORED RESEARCH OR DEVELOPMENT

Not applicable.

BACKGROUND OF THE INVENTION

1. Field of the Invention

The present invention generally relates to communication systems. More particularly, the invention generally relates to controlling the signal-to-interference ratio ("SIR") in a multi-data-rate communication system.

2. Background Information

Wireless communication systems (e.g., cellular telephone systems) may suffer from various channel impairments, such as fading, dropped calls, etc. To ameliorate the effects of such impairments, in the face of such impairments some communication systems strive to guarantee a prescribed quality of service ("QoS"). At least one metric directly related to QoS is the received signal-to-interference ratio ("SIR"). A high SIR value means that the power of the data signal is relatively high as compared to the average power of interference. Interference may stem from nearby cell phone transmissions and other sources. A low SIR value means that the average power of interference is relatively high compared to the power of the data signal.

A high SIR is generally desirable to transmit data error-free across a wireless medium. A high SIR, however, requires a higher transmit power level associated with the data to be transmitted than would be the case for a low SIR. That is, increasing transmission power leads to an increase in SIR. Increasing the transmission power of a cell phone may disadvantageously cause that phone's transmission to interfere with the transmissions of nearby cell phones. In general, therefore, it is desirable to have a cell phone transmit at a power level that is minimally sufficient to support the desired SIR. In some conventional cell phone systems, this power control may be implemented by each phone determining the number of transmission errors it is experiencing per unit of time. If the phone is experiencing too many errors, the phone may submit a request to the base station (i.e., cell tower) to which it is currently associated to step up transmission power. The cell tower may contain the centralized logic to balance the power load of its associated cell phones. If acceptable, the cell tower may grant a phone's request for more power. In response, the tower may step up the transmitted power level. On the other hand, if the phone is not experiencing too many errors, the phone may request permission from its tower to step down its transmission power. In this manner, a control loop is formed in an attempt to control the power level of each phone.

The aforementioned system generally works well when the communication data rate is constant. A problem may occur in communication systems in which the data rate may vary. Some systems employ variable block sizes and thus variable data rates. That is, the number of bits comprising each data block may vary, thereby resulting in variable data rates. The transmission power required to maintain a minimally sufficient SIR may be different between the different data rates. If the cell phone is currently transmitting at a particular data rate, the power level will automatically be stepped down to a minimum level as described above. However, the phone may then suddenly desire to jump to a higher data rate (e.g., the user may start speaking after a prolonged period of silence). At that point, the transmission power level of the phone may be too low to support the higher needed data rate for a minimally acceptable SIR. As a result, data may not be received correctly and/or the call may be dropped altogether. A solution to this problem is desirable.

BRIEF SUMMARY OF THE PREFERRED EMBODIMENTS OF THE INVENTION

The problem described above may be solved by a communication device and associated method and software that adjusts the transmit power level based on a desired quality of service parameter and based on a data rate being used to transmit data. In accordance with some embodiments, the communication device comprises a processor, a transceiver coupled to the processor, and a power source that provides a power level to the transceiver for wirelessly transmitting data at a variable data rate. The processor obtains a first value indicative of a number of transmission errors, computes a second value using the first value and based on the data rate, and determines whether the second value is below a threshold. Based on a comparison of the second value to said threshold, the processor initiates a change in the power level. The power level may be increased or decreased depending on the results of the comparison.

In accordance with another embodiment, a communication device includes a processor capable of determining a signal-to-interference ratio ("SIR"), a transceiver coupled to the processor, and a power source that provides a power level to the transceiver for wirelessly transmitting data in a plurality of frames at a variable data rate. The processor adjusts the power level based on whether a current frame contains an error, but not permitting the power level to be decreased to a level at which the SIR falls below a threshold. The threshold preferably is set so as to ensure a desired quality of service for any data rate.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, different companies may refer to a component and sub-components by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either a direct or indirect electrical connection. Thus, if a first device couples to a second device, that connection may be through a direct electrical connection, or through an indirect electrical connection via other devices and connections. To the extent that any term is not specially defined in this specification, the intent is that the term is to be given its plain and ordinary meaning.

DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
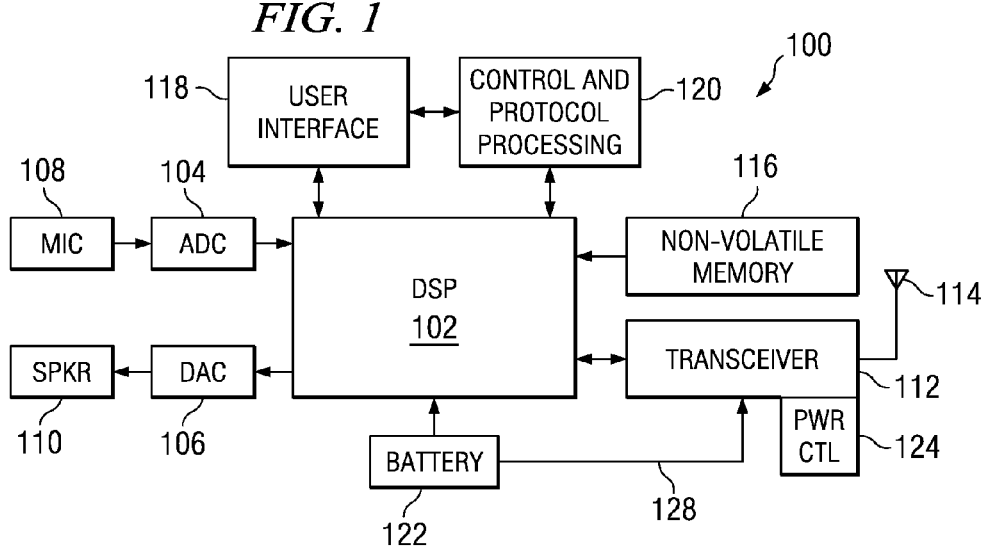
FIG. 1 illustrates a block diagram of a wireless communication device in accordance with a preferred embodiment of the invention.

Referring now to FIG. 1, a wireless communication device 100 is shown configured in accordance with a preferred embodiment of the invention. The device 100 may be representative of a cell phone, or other wireless device. As shown, the wireless communication device 100 may include a digital signal processor ("DSP") 102, an analog-to-digital converter ("ADC") 104 and microphone 108, a digital-to-analog converter ("DAC") 108 and speaker 110, a transceiver 112 and antenna 114, a non-volatile memory 116, a user interface 118, control and protocol processing logic 120, a battery 122, and a power controller 124 which may be part of transceiver 112.

Audio signals from the microphone 108 are provided to the ADC 104 for conversion to digital format. The ADC 104, as well as the DAC 106, may be a device separate from DSP 102 or integrated into the DSP. The DSP 102 preferably receives the digitized audio signals from the ADC 104 and processes the signals according to executable firmware stored on, and retrieved from, the non-volatile memory. The DSP 102 may comprise any suitable DSP such as various DSPs provided by Texas Instruments. The DSP may receive digitized audio signals from the ADC 104 and process the signal in a suitable manner for transmission through the transceiver 112 and antenna 114. Such processing may include any one or more of: encoding, filtering, encrypting, and modulating. The DSP 102 may also receive signals from the transceiver 112 and process such signals to provide them through the DAC 106 and to the speaker 110. This latter processing may include any one or more of: decoding, filtering, decrypting, and demodulating. The DSP 102 may also perform other functions such as, and without limitation, frame synchronization.

The user interface 118 provides the ability to visually display information to the user such as the phone number being dialed, status, time, etc., as well as providing an input device (e.g., a keypad) through which the user can provide input to the communication device 100. The user interface 118 preferably is managed by the control and protocol processing logic 120. The control and protocol processing logic 120 may be implemented as a microcontroller, or other suitable device.

The battery 122 supplies power for the DSP 102, the transceiver 112 as shown as well as the rest of the electrical components in device 100. The power controller 124 preferably controls the transmit power of the transceiver 112 via power signal 128. As will be described below, the DSP 102 determines the transmit power level and causes the power controller 124 to step up or down the power level as needed.

Referring still to FIG. 1, non-volatile memory 116 may comprise a read only memory ("ROM"), flash memory, or other suitable type of non-volatile memory. The non-volatile memory 116 may be separate from, or integrated into, the DSP 102. As noted above, non-volatile memory 116 preferably includes the firmware code executed by the DSP 102. During system initialization, the firmware code stored on non-volatile memory 116 may be copied to volatile memory (not specifically shown) contained within the DSP 102 and executed therefrom. The firmware preferably implements some, or all, of the functionality described below.

The communication device 100 preferably is capable of transmitting and receiving data having different data rates and block sizes. In accordance with a preferred embodiment of the invention, the transmit power level of the communication device 100 is controlled to be at a level that avoids or ameliorates the problem noted above. In one embodiment, the power level preferably is not permitted to fall below a certain level. That minimum level represents a minimum level by which a desired QoS (e.g., SIR) can be ensured regardless of the data rate. As such, if the power level has been reduced to the minimum permitted level for a low data rate transmission and the data rate suddenly increases, the communication device 100 will be able to accommodate the new, higher data rate at an acceptable SIR. A balance is thus reached between reducing the power level of a communication device to minimize detrimental interference with other communication devices and ensuring the communication devices' ability to accommodate varying data rates at an acceptable SIR.

Before continuing on, it should be understood that, in accordance with the preferred embodiment of the invention, data may be transmitted back and forth between the communication device 100 and a transceiver station (e.g., cell tower), in the form of "frames." Different types of frames may be possible for providing data, control information, requests, acknowledgments, etc. Some, or all, frames preferably include one or more bits that permit transmission errors to be detected and corrected. One suitable embodiment of error detection and correction bits include Cyclic Redundancy Check (CRC) bits, which are well known. Using the CRC bits when the DSP 102 receives a data frame, it can determine whether or not the frame was received in error. The DSP preferably also maintains a running log of error history and can provide, compute, or otherwise determine, a periodic report containing information indicative of transmission errors. Such report may include, without limitation, a block error rate, the number of frames in error over a given period of time, and the total number of frames received over the same period of time.

Figure 2:
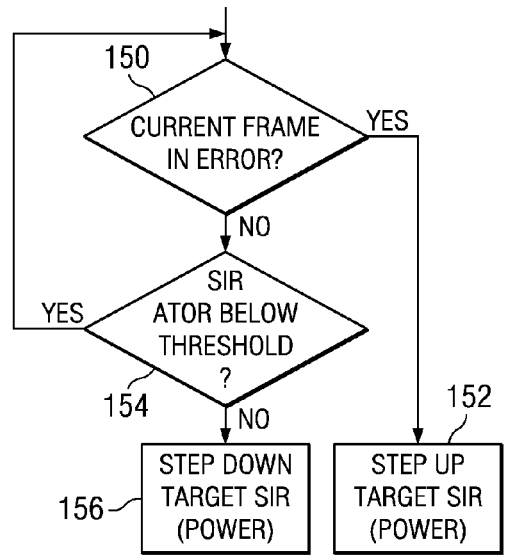
FIG. 2 shows a method of controlling the target SIR in accordance with a preferred embodiment of the invention.

One embodiment of the invention includes the DSP 102, via its firmware, performing the algorithm shown in FIG. 2. In decision block 150, the DSP 102 determines whether a current data frame includes any bit errors. The determination as to whether the current frame includes errors may include receiving the periodic error report and determining from that report whether any bits have been detected as being erroneous. Alternatively, it may be desired to determine whether or not the number of bits in error, if any, greater than a specified non-zero value have been detected, or whether the block error rate is greater than a non-zero value. For example, a block error rate of 1% may be acceptable and thus the DSP 102 in decision block 150 determines whether the block error rate is greater than 1%. These non-zero threshold values may be determined from field data as would be understood by one of ordinary skill in the art. If the result of decision block 150 is "yes," control passes to block 152 in which the communication device 100 attempts to step up its target SIR. Stepping up the target SIR is accomplished by boosting transmit power. In one embodiment, stepping up the SIR (power) may be performed by the communication device 100 submitting a request to the transceiver station (not specifically shown) for a boost in power in accordance with known techniques. The transceiver station may then decide whether to grant the request for more power. If the request is indeed granted, the transceiver station responds to the communication device 100 with a frame indicating that the device 100 may step up its power. The communication device's DSP 102 preferably responds by causing the power controller 124 to boost the battery power to the transceiver 112 to a higher level.

If, however, the current frame is not in error, or the error rate does not exceed a non-zero level, control passes to decision block 154. In decision block 154, a determination is made as to whether the target SIR is at or below a predetermined threshold. The threshold value guarantees that the SIR (and thus the power level) never drop so low that a sudden increase in data rate will be problematic for the communication device in terms of signal quality. In one embodiment, the threshold may be pre-programmed. If, in decision block 154, it is determined that the SIR is still above the threshold, control passes to block 156 in which the target SIR for the communication device is stepped down by a predetermined amount. This step down action may be implemented by reducing the transmit power level of the communication device's transceiver 112.

Figure 3:
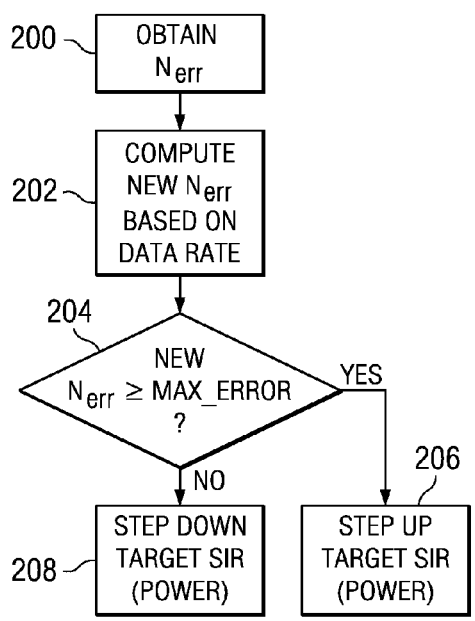
FIG. 3 also shows a method of controlling the target SIR in accordance with another preferred embodiment of the invention.

FIG. 3 shows another embodiment of the invention. As shown, the number of errors ($N_{err}$) is determined or retrieved by the DSP 102 (block 200). The value of $N_{err}$ obtained in block 200 preferably represents the number of errors received over a predetermined period of time, or for a predetermined number of previously received frames. In block 202, the DSP 102 preferably computes a new value of $N_{err}$ based on the current data rate. By adjusting the number of errors in a way that is a function of the data rate, the value of $N_{err}$ can be adjusted effectively so as to encode the concept of the threshold represented by block 154 in FIG. 2. Three exemplary techniques for implementing block 202 are provided and discussed below. In decision block 204, if the new value of $N_{err}$ is greater than or equal to a predetermined value (called MAX_ERROR), control passes to block 206 in which the target SIR is stepped up as explained above. Otherwise, control passes to block 208 in which the target SIR is stepped down. The value MAX_ERROR may be programmed and determined based on field data as would be understood by one of ordinary skill in the art.

The following explanation provides various exemplary techniques for transforming the value of $N_{err}$ obtained in 200 to a new value of $N_{err}$ based on data rate. In accordance with one such exemplary technique, the new value of $N_{err}$ is computed as:

$$N_{err} = N_{err} + N_{total} * \Delta_i \quad (1)$$

where $N_{total}$ represents the total number of blocks in the current reporting period and $\Delta_i$ is defined as follows. In a communication system that permits various data rates, the value K represents the number of possible data rates. Each data rate is denoted by the value R and there are $R_1, R_2, \ldots, R_K$ data rates. Associated with each data rate R is a code block size C. Thus, rate $R_i$ has a code block size $C_i$. For a given SIR, the achieved QoS for rate $R_i$ may be denoted as $QOS_{i,SIR}$. The value SIR* may be defined to be the minimal SIR level that guarantees any rate of transmission meeting or exceeding the given QoS. As such, the value QoS* is the maximum of the various $QoS_{i,SIR}$ values. With these definitions the value $\Delta_i$ used in formula above (1) is given by:

$$\Delta_i = QoS^* - QoS_{i,SIR} \quad (2)$$

In accordance with another embodiment, the value of $N_{err}$ obtained in block 200 can be adjusted by multiplying the obtained value of $N_{err}$ as follows:

$$N_{err} = N_{err} + f(l_i) * N_{total} * QoS^* \quad (3)$$

Where the function $f(l_i)$ may be $$1 - \frac{QoS_i}{QoS^*}.$$

This technique permits the computation of Nerr without a look-up table at a cost of minimum performance degradation.

In accordance with yet another embodiment, $N_{err}$ can be computed as:

$$N_{err} = N_{total} \times QoS^*$$

This embodiment is particularly suitable if the absolute value of the difference (C−C*) is greater than or equal to kC* where k is a predetermined constant depending on the coding-modulating scheme and system performance.

The subject matter described herein provides an effective technique for SIR target control in a multi-data-rate communication system. The techniques described may help to guarantee a desired QoS regardless of data rate.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A communication device, comprising:
   a processor;
   a transceiver coupled to said processor, said transceiver receives blocks of data; and
   a power source that provides a power level to said transceiver for wirelessly transmitting data at a variable data rate;
   wherein said processor obtains a first value indicative of a number of transmission errors, computes a second value using the first value and based on the data rate, and determines whether the second value is below a threshold;
   wherein, based on a comparison of said second value to said threshold, said processor initiates a change in said power level; and wherein said processor computes said second value by adding a third value to said first value, said third value being based on a difference between a quality of service value that is the maximum of the quality of service values associated with all possible data rates and a quality of service value associated with a current data rate.

2. The communication device of claim 1 wherein said processor steps up said power level if said second value is greater than or equal to said threshold.

3. The communication device of claim 2 wherein said processor steps down said power level if said second value is less than said threshold.

4. The communication device of claim 1 wherein said initiating a change in said power level comprises said communication device submitting a request to a transceiver station requesting approval for said communication device to increase power to its transmitter, and, upon receiving a response from said transceiver station approving the power level increase, increasing power to the transceiver.

5. The communication device of claim 1 wherein said initiating a change in said power level comprises said communication device submitting a request to a transceiver station requesting approval for said communication device to decrease power to its transmitter, and, upon receiving a response from said transceiver station approving the power level decrease, decreasing power to the transceiver.

6. A communication device, comprising:
   a processor;
   a transceiver coupled to said processor, said transceiver receives blocks of data; and
   a power source that provides a power level to said transceiver for wirelessly transmitting data at a variable data rate;
   wherein said processor obtains a first value indicative of a number of transmission errors, computes a second value using the first value and based on the data rate, and determines whether the second value is below a threshold;
   wherein, based on a comparison of said second value to said threshold, said processor initiates a change in said power level; and
   wherein said processor computes said second value by multiplying a total number of data frames by a quality of service value that is the maximum of the quality of service values associated with all possible data rates.

7. The communication device of claim 6 wherein said initiating a change in said power level comprises said communication device submitting a request to a transceiver station requesting approval for said communication device to increase power to its transmitter, and, upon receiving a response from said transceiver station approving the power level increase, increasing power to the transceiver.

8. The communication device of claim 6 wherein said initiating a change in said power level comprises said communication device submitting a request to a transceiver station requesting approval for said communication device to decrease power to its transmitter, and, upon receiving a response from said transceiver station approving the power level decrease, decreasing power to the transceiver.

9. The communication device of claim 6 wherein said processor steps up said power level if said second value is greater than or equal to said threshold.

10. The communication device of claim 6 wherein said processor steps down said power level if said second value is less than said threshold.

11. A non-transitory storage medium storing instructions that when executed by a processor cause the processor to perform a method for adjusting a transmit power level associated with a wireless communication device based on a data rate, said instructions comprising:
   (a) instructions that obtains a first value indicative of a number of transmission errors;
   (b) instructions that compute a second value using the first value and based on the data rate;
   (c) instructions that determine whether the second value is below a threshold;
   (d) instructions that, based on a comparison of said second value to said threshold, initiate a change in said power level;
   (e) instructions that cause said power level to be decreased if said second value is less than said threshold; and
   (f) instructions that compute said second value by adding a third value to said first value, said third value being based on a difference between a quality of service value that is the maximum of the quality of service values associated with all possible data rates and a quality of service value associated with a current data rate.

12. The storage medium of claim 11 further including instructions that cause said power level to be increased if said second value is greater than or equal to said threshold.

13. The storage medium of claim 11 further including instructions that cause said power level to be decreased if said second value is less than said threshold.

14. A non-transitory storage medium storing instructions that when executed by a processor cause the processor to perform a method for adjusting a transmit power level associated with a wireless communication device based on a data rate, said instructions comprising:
   (a) instructions that obtains a first value indicative of a number of transmission errors;
   (b) instructions that compute a second value using the first value and based on the data rate;
   (c) instructions that determine whether the second value is below a threshold;
   (d) instructions that, based on a comparison of said second value to said threshold, initiate a change in said power level; and
   (e) instructions that compute said second value by multiplying a total number of data frames by a quality of service value that is the maximum of the quality of service values associated with all possible data rates.

15. The storage medium of claim 14 further including instructions that cause said power level to be increased if said second value is greater than or equal to said threshold.

16. The storage medium of claim 14 further including instructions that cause said power level to be decreased if said second value is less than said threshold.

17. A method of adjusting a transmit power level associated with a wireless communication device based on a data rate, comprising:
   (a) obtaining a first value indicative of a number of transmission errors;
   (b) computing a second value using the first value and based on the data rate, adding a third value to said first value, said third value being based on a difference between a quality of service value that is the maximum of the quality of service values associated with all possible data rates and a quality of service value associated with a current data rate,
   (c) determining whether the second value is below a threshold;
   (d) based on a comparison of said second value to said threshold, initiating a change in said power level.

18. The method of claim 17 further including causing said power level to be increased if said second value is greater than or equal to said threshold.

19. The method of claim 17 further including causing power level to be decreased if said second value is less than said threshold.

20. The method of claim 17 wherein said initiating a change in said power level comprises said communication device submitting a request to a transceiver station requesting approval for said communication device to increase its transmit power level, and, upon receiving a response from said transceiver station approving the transmit power level increase, increasing the transmit power level.

21. The method of claim 17 wherein said initiating a change in said power level comprises said communication device submitting a request to a transceiver station requesting approval for said communication device to decrease its transmit power level, and, upon receiving a response from said transceiver station approving the transmit power level decrease, decreasing the transmit power level.

22. A method of adjusting a transmit power level associated with a wireless communication device based on a data rate, comprising:
(a) obtaining a first value indicative of a number of transmission errors;
(b) computing a second value using the first value and based on the data rate, wherein computing said second value includes multiplying a total number of data frames by a quality of service value that is the maximum of the quality of service values associated with all possible data rates,
(c) determining whether the second value is below a threshold;
(d) based on a comparison of said second value to said threshold, initiating a change in said power level.

23. The method of claim 22 further including causing said power level to be increased if said second value is greater than or equal to said threshold.

24. The method of claim 22 further including causing power level to be decreased if said second value is less than said threshold.

25. The method of claim 22 wherein said initiating a change in said power level comprises said communication device submitting a request to a transceiver station requesting approval for said communication device to increase its transmit power level, and, upon receiving a response from said transceiver station approving the transmit power level increase, increasing the transmit power level.

26. The method of claim 22 wherein said initiating a change in said power level comprises said communication device submitting a request to a transceiver station requesting approval for said communication device to decrease its transmit power level, and, upon receiving a response from said transceiver station approving the transmit power level decrease, decreasing the transmit power level.

* * * * *